Figure 1:
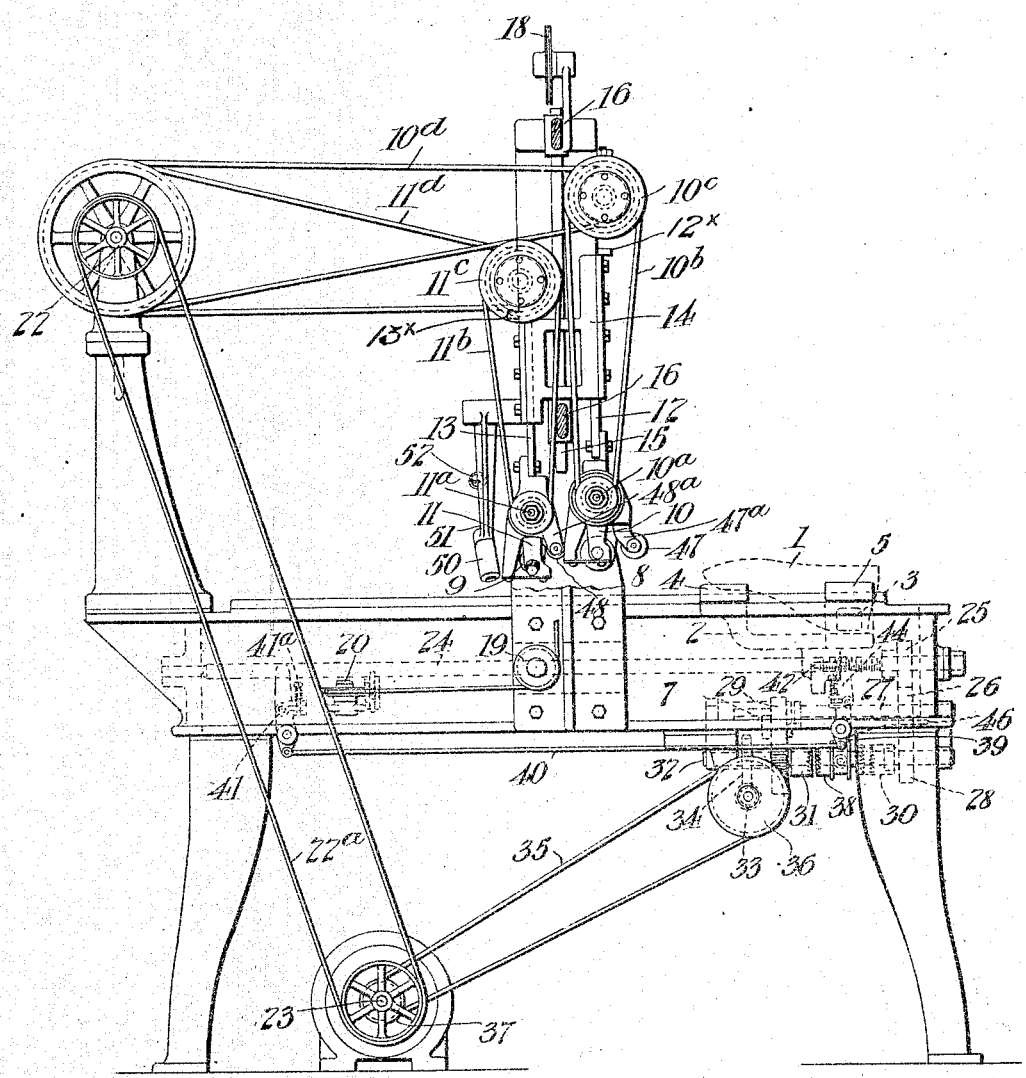

J. E. PERRAULT.
MEANS FOR EFFECTING THE UNION OF LAYERS HAVING ADHESIVE SURFACES.
APPLICATION FILED MAY 4, 1914.

1,184,990.

Patented May 30, 1916.
2 SHEETS—SHEET 1.

Witnesses

Inventor
Joseph E. Perrault

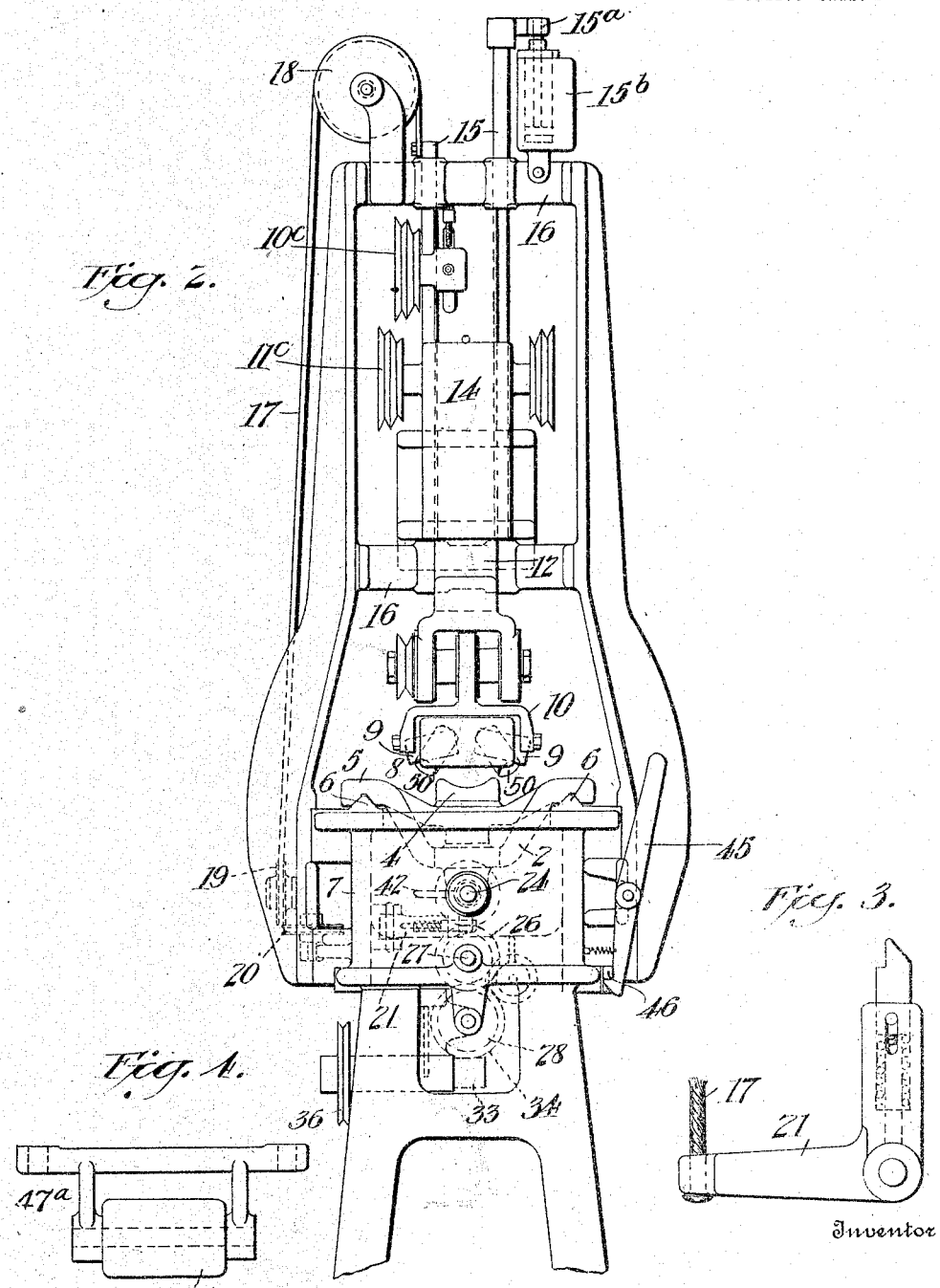

UNITED STATES PATENT OFFICE.

JOSEPH E. PERRAULT, OF BELMONT, MASSACHUSETTS, ASSIGNOR TO HOOD RUBBER CO., OF WATERTOWN, MASSACHUSETTS, A CORPORATION OF MASSACHUSETTS.

MEANS FOR EFFECTING THE UNION OF LAYERS HAVING ADHESIVE SURFACES.

1,184,990.     Specification of Letters Patent.     Patented May 30, 1916.

Application filed May 4, 1914. Serial No. 836,292.

*To all whom it may concern:*

Be it known that I, JOSEPH E. PERRAULT, citizen of the United States, residing at Belmont, Massachusetts, have invented certain new and useful Improvements in Means for Effecting the Union of Layers Having Adhesive Surfaces, of which the following is a specification.

My present invention relates to an improved method of joining together layers or articles of adhesive material such, for example, as layers of unvulcanized rubber or rubber having incorporated therein fabric or the like, or fabric coated with rubber known to the trade as friction fabric, and also an apparatus for carrying out said method, and the invention includes the novel apparatus for performing the same hereinafter described and particularly defined by the appended claims. A form of apparatus suitable for carrying out this method is illustrated in the accompanying drawings, in which—

Figure 1 is a sectional elevation; Fig. 2 is an end view; Figs. 3 and 4 are detail views.

According to my improved method, the layers or articles of adhesive material to be joined are superimposed upon each other, and simultaneously subjected to a rolling pressure and a vibratory movement imparted by giving a vertical reciprocation to either the article or the mechanism by which the rolling pressure is imparted. I have found a most convenient manner of carrying out the method is to provide a vertically reciprocating roller, and to move the articles or layers to be joined at right angles to the plane of reciprocation of the roller. It will be obvious that this method might be carried out by hand manipulation, to wit: by supporting the layers or articles upon any convenient support and manipulating the roller by hand through the required movements, but it would be difficult by hand to get the requisite uniformity of movement, and proper pressure at all times, and I have therefore devised a machine capable of carrying out the method in a simple and expeditious manner.

In the accompanying drawings which illustrate such a machine, I have shown it as adapted to apply the rubber soles to boots and shoes, but it will be obvious that it will be applicable to securing together any adhesive material by merely changing the form of last or core, and in some instances modifying the character of mechanism for moving the core, as if the layers to be joined were to constitute an annular article such for instance as a tire, the reverse motion of the core would be unnecessary, as forward rotary motion only of the core or support would be sufficient.

Referring more particularly to these drawings, the numeral 1 is intended to designate a rubber shoe with its superimposed rubber sole and which has within it the ordinary last. The shoe and last are supported by a supporting member 2 which has a projection 3 engaging the usual recess in the heel portion of the last, and a seat 4 of proper shape for supporting the toe. These supporting parts are carried by or form part of a carriage 5 mounted to reciprocate horizontally upon guide rails 6 supported from the main frame 7 of the machine, and the reciprocating motion of the carriage is effected by means hereinafter more particularly described to cause it to pass under the roller or rollers which impart the rolling and vibratory pressure to the sole. I prefer to provide a plurality of such rollers operated in succession, the first roll 8 being a substantially straight faced roll and operating in contact with the central portion of the outsole, and following this a pair of rolls 9 arranged at an angle of approximately 15°, and with their outer ends depending beyond the roll 8, thus making contact on the outsole where the roll 8 does not, especially on or near the edges of the outsole. These rolls 8 and 9 are carried respectively by forks or yokes 10 and 11 having their upper ends carried by eccentric shafts $10^a$ and $11^a$, which are journaled in bearings carried by the lower ends of slides 12 and 13. These slides are mounted to reciprocate or have free and independent but limited vertical movement in the frame 14, downward movement of the slides with relation to the frame being limited by stops $12^x$ and $13^x$. This frame is carried on rods 15 sliding in the cross bars 16, and is adapted to be lifted by means of a cable 17 connected to one of the rods and passing over pulleys 18, 19 and 20, and connected to a bell crank lever 21 adapted to be operated by the carriage after the completion of its forward or working movement so as to lift the rolls clear of the surface of the outsole on the return movement of the carriage.

The eccentric shafts 10ª and 11ª are driven by belts 10ᵇ and 11ᵇ passing respectively over pulleys mounted on the eccentric shafts as shown, and over upper pulley 10ᶜ and 11ᶜ carried by the upper ends of the slides, and driven by horizontally extending belts 10ᵈ and 11ᵈ passing over suitable pulleys connected with the pulleys 10ᶜ and 11ᶜ, and over suitable drive pulleys on the drive shaft 22 which may be driven from any suitable source of power as, for instance, by belt 22ª from main drive shaft 23. The carriage is given its reciprocating movement by a screw shaft 24 journaled in the frame of the machine, and engaging a suitable nut or half nut connected with the carriage. The screw shaft is connected by gears 25 and 26 with a countershaft 27 which, in turn, is connected by two sets of gears indicated at 28 and 29, (one set of which constitutes reversing gears), with the clutch members 30 and 31 loose on shaft 32, which shaft is driven through worm 33 and worm gear 34 from the main power shaft 23 by belt 3ᵇ and pulleys 36 and 37, as shown. Splined on shaft 32 is a double faced clutch member 38 which, when in one position, couples the direct gears 29 with the countershaft, and in the other position couples the shaft 32 with the screw shaft 24 through the reversing gears, thus effecting the return movement of the carriage. This clutch is adapted to be operated by a pivoted clutch fork 39 connected by a rod 40 to a pivoted arm 41 at the extreme left of the machine (Fig. 1), adapted to coöperate with a lug 42 connected with the carriage. The arm 41 is composed of two parts hinged together, and held in alinement by spring 41ª so that the upper portion of the arm can yield, if necessary, and prevent any strains due to otherwise inelastic connections.

The reverse gearing is disconnected from the drive shaft on the return movement of the carriage by the lug or projection 42 on the carriage striking the free end of spring arm 44 which is carried by the same shaft to which clutch operating arm 39 is secured, and this disconnects the shaft 32 from the reverse gearing. Movement of the clutch member 38 sufficient to cause it to engage clutch 31 is prevented by the hand lever 45 which has a hooked lower end engaging the lever 46 which holds the clutch member 38 in neutral position, and stops the carriage to permit the removal of the last and its replacement by a fresh article to be operated upon. Thereafter the movement of the hand lever 45 releases the lever 46, allowing the same to drop and throw the movable clutch member into engagement with the clutch member 31.

I find it desirable to provide in connection with the carriages or slides of the vibratory rollers 8 and 9 lift rolls 47 and 48 which are elevated sufficiently above the lower surfaces of the rolls 8 and 9 to contact with the surfaces of the outsoles and to insure the rise of these vibratory rolls into position to act properly upon the outsoles. These rollers 47 and 48 are non-vibratory and are carried by brackets 47ª and 48ª depending from the lower ends of slides 12 and 13, bracket 47ª and roller 47 being omitted from Fig. 2 for more clearly illustrating roller 8. I also find it desirable to provide a pair of non-vibratory rolls 50 arranged at an angle substantially as shown, and carried by pivoted arms 51 drawn toward each other by a spring 52, thereby producing a bearing action on the edges of the outsole and wrapping it firmly over the edge of the last.

Any suitable means may be employed to hold the frame 14 elevated during the return movement of the carriage, but a convenient means for accomplishing this purpose is to connect to one of the rods 15 an arm 15ª to which is connected a piston working in a dashpot 15ᵇ, the action of which may be timed to hold the rods elevated and thus the rolls out of contact with the work during the return movement of the carriage. The function of the dash pot is simply to prevent immediate descent of the parts, by the ordinary dash pot action. As the slides are raised by the impact of the carriage against bell crank 21, it is obvious that as soon as the bell crank is freed from the carriage the slides would drop immediately unless some means were provided to hold them elevated until the carriage has returned to initial position, and this is accomplished by the dash pot.

Having thus described my invention what I claim is:

1. An apparatus for joining together superimposed layers of material having adhesive surfaces comprising a support, a roller, means for producing transverse movement of one of said parts with relation to the other to cause the roller to roll over the superimposed layers, and means for imparting a vibratory movement in a plane substantially vertical to the surface of said layers to one of said parts during the rolling action.

2. An apparatus for effecting the junction of superimposed layers having adhesive surfaces comprising a support for said layers, means for imparting movement to said support, a roller adapted to act upon said layers during such movement, and means for imparting a vibratory movement in a plane substantially vertical to the surface of said layers to said roller, substantially as described.

3. An apparatus for effecting the union of superimposed layers having adhesive surfaces comprising a support, means for moving said support, a vertically movable member having an eccentric cam shaft journaled therein, a pressure roller supported from said eccentric shaft and adapted to act upon the layers to be joined during the travel of the support, and means for rotating said eccentric shaft, substantially as described.

4. An apparatus for effecting the union of superimposed layers having adhesive surfaces comprising a support, means for moving said support, a vertically movable member having an eccentric cam shaft journaled therein, a pressure roller supported from said eccentric shaft and adapted to act upon the layers to be joined during the travel of the support, a lifting roller in advance of said pressure roller, and means for rotating said eccentric shaft, substantially as described.

5. An apparatus for effecting the junction of superimposed layers having adhesive surfaces comprising a support for such layers, means for imparting movement to such support, a plurality of independently mounted rollers adapted to press yieldingly on said layers, and means for imparting vibratory movement to said rollers in a plane substantially perpendicular to the surface of said layers during such pressing action, substantially as described.

6. An apparatus for effecting the junction of superimposed layers having adhesive surfaces comprising a support for said layers, means for imparting movement to said support, a roller adapted to act upon said layers during such movement, means for imparting a vibratory movement to said roller, a pair of inclined rollers adapted to bear on the edges of the layers, and yielding means tending to draw said inclined rollers toward each other, substantially as described.

7. In combination a reciprocating work support, a roller carrying slide freely movable at right angles to the line of travel of said work support, an eccentric journaled in said support, an idle roller having its bearings connected with said eccentric, and means for automatically elevating said slide to clear the work support on movement of the latter in one direction and lowering it to permit the roller to rest on the material carried on the work support during movement of said support in the opposite direction, substantially as described.

8. In combination a reciprocating work support, a frame movable perpendicularly to the line of travel of said support, a plurality of slides having limited vertical movement in said frame, rollers supported from said slides, means for imparting vibratory movement to said rollers, and means for effecting vertical reciprocating movement of said frame, substantially as described.

9. In combination a reciprocating work support, a frame movable perpendicularly to the line of travel of said support, a plurality of slides having limited vertical movement in said frame, rollers supported from said slides, means for imparting vibratory movement to said rollers, and means for effecting vertical reciprocating movement of said frame, a pair of arms pivoted to said frame, inclined rollers carried by said arms, and means for pressing said arms yieldingly toward each other.

10. In combination a reciprocating work support, a frame movable perpendicularly to the line of travel of said support, a plurality of slides having limited vertical movement in said frame, rollers supported from said slides, means for imparting vibratory movement to said rollers, means controlled by the work support on reaching the limit of its movement in one direction for elevating said frame, and means for holding said frame elevated during the return stroke of the work support, substantially as described.

11. In combination a carriage, a work support carried thereby, a frame movable perpendicularly to the line of movement of said carriage, a roller supported from said frame, means for imparting vibratory movement to said roller, means for moving said carriage in one direction to bring the work in contact with said roller, means automatically operated by the carriage for reversing its movement, means operated by the return movement of the carriage for elevating said frame, and means for disconnecting the carriage from its driving mechanism at the end of its return movement.

In testimony whereof, I affix my signature in presence of two witnesses.

JOSEPH E. PERRAULT.

Witnesses:
LOTTA E. MARR,
CHARLES H. ROPER.